United States Patent [19]
Nagano et al.

[11] Patent Number: 5,256,959
[45] Date of Patent: Oct. 26, 1993

[54] CONTROL SYSTEM FOR GENERATOR MOUNTED ON VEHICLE

[75] Inventors: Masami Nagano; Takeshi Atago; Masahide Sakamoto; Yuichi Mori, all of Katsuta, Japan

[73] Assignee: Hitachi, Ltd., Tokyo, Japan

[21] Appl. No.: 670,285

[22] Filed: Mar. 15, 1991

[30] Foreign Application Priority Data

Mar. 19, 1990 [JP] Japan .................................. 2-067076

[51] Int. Cl.$^5$ .............................................. H02J 7/00
[52] U.S. Cl. .......................................... 322/25; 320/64
[58] Field of Search ................... 322/22, 23, 24, 25, 322/28, 29, 33, 34; 320/64, 68, 61, 62

[56] References Cited

U.S. PATENT DOCUMENTS

| | | | |
|---|---|---|---|
| 3,991,357 | 11/1976 | Kaminski | 320/62 X |
| 4,543,521 | 9/1985 | Morishita et al. | 320/64 |
| 4,598,373 | 7/1986 | Morishita et al. | 322/25 X |
| 4,608,639 | 8/1986 | Morishita et al. | 322/25 X |
| 4,651,081 | 3/1987 | Nishimura et al. | 320/64 |

FOREIGN PATENT DOCUMENTS

| | | |
|---|---|---|
| 0106539 | 4/1984 | European Pat. Off. . |
| 0438884 | 7/1991 | European Pat. Off. . |
| 0016195 | 1/1985 | Japan . |

Primary Examiner—Kristine L. Peckman
Attorney, Agent, or Firm—Antonelli, Terry Stout & Kraus

[57] ABSTRACT

A control system for controlling the full current of a generator for a vehicle having an internal combustion engine operates to control the field current so as to change the output power of the generator. A storage unit is charged by the generator; a field current control unit for controlling the field current of the generator detects the output generated by the storage unit; and an engine control unit to which operation parameters of the internal combustion engine are applied controls at least one of a fuel supply and an ignition timing for the internal combustion engine. The engine control unit further operates to determine a kind of change of load being applied to the internal combustion engine when the load has changed and to control the field current of the generator in accordance with a predetermined control pattern corresponding to the kind of change of the load.

14 Claims, 15 Drawing Sheets

CONTROL SYSTEM FOR GENERATOR MOUNTED ON VEHICLE

BACKGROUND OF THE INVENTION

1. Field of the Invention

The present invention relates to a charging system for a vehicle having an internal combustion engine, and more particularly to a control system for a generator for a vehicle for generating power by being driven by the internal combustion engine.

2. Description of the Prior Art

A control of a generator mounted in a vehicle for generating power by being driven by the internal combustion engine of the vehicle, has generally been performed by control of a field current by using a control unit, such as a so-called IC regulator. The IC regulator detects an output voltage of a battery which is charged by an output of the generator, and supplies a field current to generate power when the output voltage becomes equal to or lower than a predetermined value, and operates to stop the power generation by cutting off the field current when the output voltage becomes higher than the predetermined value.

According to JP-A-No. 60-16195 (Mori), a control unit for a generator mounted in a vehicle controls a field current of the generator by using a microcomputer so as to perform an overall control of a power generation operation of the generator in a satisfactory manner in accordance with a state of the engine and a state of an electrical load, as well as the battery output. As is clear from an electrical circuit shown in FIG. 2 of Mori, the control unit comprising a microcomputer uses operation parameters for an internal combustion engine including sensors, etc. for detecting a turning-on of an air conditioner, head lamps, etc., to detect an operation state of the engine or a state of an electrical load. Based on the detected state of the engine operation or the detected state of the electrical load, the control unit controls the power generation of the generator mounted in the vehicle by changing over a target voltage value of a regulator for controlling the power generation in two stages.

In the latter example of the above-described control unit for a generator according to the prior-art technique, it is possible to expect a better control by the performance of an overall control of a power generation operation by detecting the state of engine operation and the state of the electrical load. However, the above method is designed merely to change over a target value of the regulator only in two stages in order to control the power generation operation of the generator. According to this method, there may easily occur variations in the number of engine revolutions and vibrations of the engine by a stepwise variation of the load of the generator during power generation, particularly during a period of an idle operation, because a rotary driving of the generator during a period of power generation works as a load for the engine. In other words, even if the above target value has been changed over, the field current is supplied if the battery voltage has not reached this target value, so that the generator is set to a power generation state, and the power generation is stopped when the target value is exceeded.

SUMMARY OF THE INVENTION

In the light of the above-described problems of the prior-art techniques, it is an object of the present invention to provide a control system for a generator mounted on a vehicle which satisfactorily matches the operation state of the internal combustion engine by more organically and integrally controlling the internal combustion engine and the generator.

According to the present invention, in order to achieve the above object, a control system for a generator mounted in a vehicle, having an internal combustion engine and a generator driven by the internal combustion engine, operates to control, the field current of the generator thereby to change the output power used to charge a battery unit. For this purpose, the control system has a field current control unit for controlling the field current of the generator by detecting the power outputted from the battery unit, and an internal combustion engine control unit responsive to operation parameters of the internal combustion engine to control at least one of a fuel supply quantity and an ignition timing for the internal combustion engine. The internal combustion engine control unit is characterized by the capability to decide on the kind of a load change which has occurred when a load for the internal combustion engine has changed and to control the field current of the generator in accordance with a predetermined control pattern corresponding to the kind of load change.

In the control system for a generator for a vehicle according to the present invention, the field current for controlling the power generation operation of the generator is controlled in accordance with a predetermined control pattern which corresponds to a variation of a mechanical load to the internal combustion engine, based on the recognition that the generator, during a power generation operation, works as a mechanical load to the internal combustion engine.

Namely, when a mechanical load of an internal combustion engine has changed suddenly, it is generally not possible for the internal combustion engine to follow a variation of this load immediately, and as a result, the number of engine revolutions reaches a stable area which corresponds to the mechanical load after passing through an unstable state involving an up-and-down variation of the revolutions of the engine. However, the variation of the internal combustion engine in this unstable state will lead to a so-called jolting which involves a vibration in forward and backward directions of the vehicle, which provides the driver of the vehicle with much discomfort.

According to the present invention, the above-described mechanical load variation is reduced by controlling the power generation operation of the generator, or by controlling the field current therefore. In this case, it is possible to match the mechanical load variation the load variation response characteristics of the internal combustion engine by controlling the field current based on a predetermined control pattern which is suitable for the kind of the mechanical load variation. By this arrangement, it becomes possible to control the operation of the generator to adapt it to the state of the operation of the internal combustion engine despite variation of the mechanical load on the internal combustion engine. Further, a variation of the electrical load to the generator can also be controlled in accordance with the above-described predetermined control pattern when the field current is to be changed, so that it becomes possible to control the operation of the generator to adapt to the state of the operation of the internal combustion engine, in the same manner as described above.

DESCRIPTION OF THE PREFERRED EMBODIMENT

Detailed description will be made of the control system for a generator for a vehicle in accordance in one embodiment of the present invention, with reference to the attached drawings.

Figure 2:
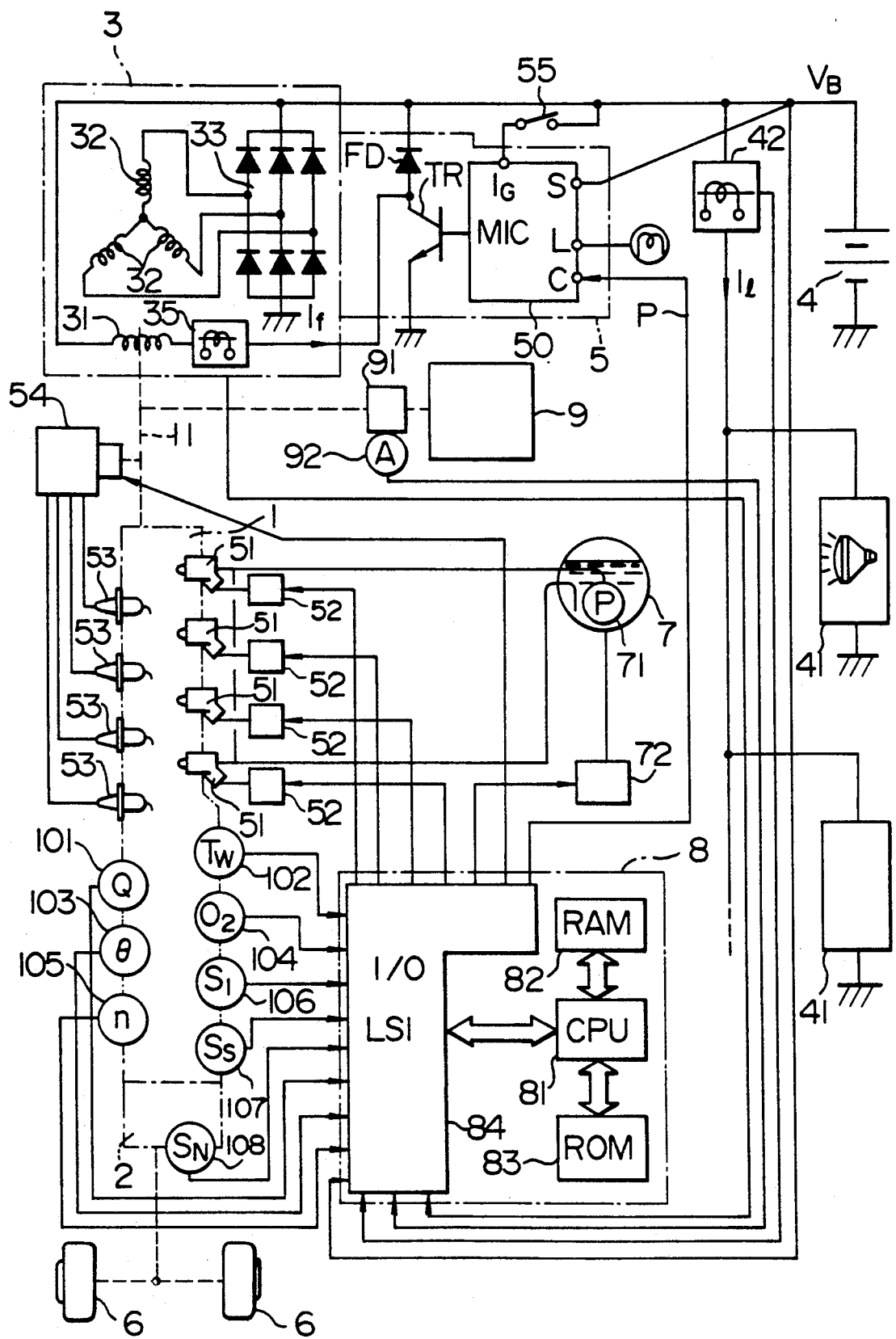
FIG. 2 is a block diagram showing the total structure of the control system.

FIG. 2 shows a structure of the overall control system for a generator according to the present invention. In this drawing, an internal combustion engine 1 for a vehicle, such as an automobile, for example, comprises an output shaft, that is a crown shaft 11, for outputting a revolution torque. To this crown shaft 11 there is mechanically coupled a generator 3, through pulleys and belts which are not shown in the drawing. The vehicle generator 3, as a conventional generator, comprises a rotor wound with a field winding 31 on the circumference of the generator 3, and a stator wound with three-phase windings 32 so as to face the outer circumference of the stator. This rotor is rotationally driven in synchronism with the crank shaft of the internal combustion engine 1. To the three-phase windings 32 of the generator 3 is connected a commutation circuit 33 which is formed by six series and parallel connected diodes, for example, and which rectifies a three-phase AC output of the generator for supplying a rectified output to a battery 4 to charge the battery 4.

A power generation control unit 5 for adjusting an output voltage of the battery 4 by detecting a battery voltage ($V_B$) is provided in a part of the generator 3. The power generation control unit 5 controls power generation by increasing a field current $I_f$ when the battery voltage $V_B$ becomes equal to or higher than a predetermined value $V_{Thr}$ and by decreasing the field current $I_f$ when the battery voltages $V_B$ becomes lower than the predetermined value $V_{Thr}$. As is clear from the drawing, the power generation control unit 5 has a power transistor TR connected in series with the field winding 31, and controls the field current $I_f$ by interrupting the power transistor TR. To be more specific, a drive pulse $P_d$ is applied to the base of the power transistor TR from a drive circuit 50 to be described in detail later, to turn on or turn off the power transistor TR. A designation FD designates a so-called flywheel diode which is connected in parallel with the field winding 31 to protect the power transistor TR from the counter-electomotive force generated within the field winding 31 when the field current $I_f$ is cut off.

The internal combustion engine 1 has its revolution torque transmitted to drive wheels 6 through a transmission 2 in the same manner as in the case of a typical motor vehicle. In the example shown in FIG. 2, the internal combustion engine 1 is a four-cylinder type with the so-called MPI (multiple cylinder fuel injection) system, which has four injectors 51, and their drive units 52 for controlling the quantity of fuel supplied to each cylinder. In the internal combustion engine 1, each cylinder has an ignition plug 53 to generate sparks by a high voltage for ignition which is distributed in the sequence of ignition cylinders from a distributor 54 incorporating an ignition coil, for example, and to explode the fuel which is charged and compressed in each cylinder. The operations of the injectors 51, and the ignition plugs 53 are controlled by a so-called ECU (engine control unit) 8 which is a control unit for the internal combustion engine. In FIG. 2, a fuel pump 71 for compressing and supplying fuel to the injectors 51 is submerged in fuel inside a fuel tank 7 for storing the fuel to be supplied to the internal combustion engine 1. The operation of the fuel pump 71 is also controlled by the ECU8 through a fuel pump control unit 72.

As shown in FIG. 2, the ECU for controlling the internal combustion engine 1 is structured by utilizing a microcomputer or the like, for example. In the illustrated example, the ECU comprises a central processing unit (CPU) 81 for performing various kinds of operations, a random access memory (RAM) 82 for temporarily storing various kinds of data to be used for these operations, and a read only memory (ROM) 83 for storing and memorizing programs and necessary data. Further, independently from these units, a so-called input and output hybrid integrated circuit (I/O LSI) 84 is separately provided. The I/O LSI 84 takes various kinds of parameters and data necessary for the control of the internal combustion engine 1 into the microcomputer. The I/O LSI 84 incorporates an A/D converter, etc. for converting analog signals such as a voltage of battery $V_B$, into digital signals. The I/O LSI 84 is also structured to generate control signals for controlling various kinds of actuators based on results of operation of the microcomputer.

In order to detect parameters and data of the internal combustion engine necessary for the control to be performed by the ECU 8, various equipment is provided, such as an air flow meter (for example, a hot-wire type air flow sensor) 101 for detecting a quantity Q of air being taken in by the internal combustion engine, a water temperature sensor 102 for detecting the water temperature Tw of the cooling water, a throttle sensor 103 for detecting an opening $\theta$ of a throttle valve, an $O_2$ sensor 104 for detecting oxygen density $O_2$ in the exhaust gas to control the air-fuel (A/F) ratio of the supplied fuel, a crank angle sensor 105 for generating a pulse output n at every predetermined rotation angle (for example, one degree) of the crank shaft 11 to detect a speed or revolution angle of the internal combustion engine, an idle switch 106 for detecting an idle operation state $S_I$ of the engine from the angle of the acceleration pedal or the angle of the throttle valve, for example, and a starter switch 107 for detecting an input Ss of a starter for starting the engine. Further, the transmission 2 includes a neutral switch 108 for detecting a neutral state $S_N$ or a non-neutral state.

In addition to the above-described various operation parameters and data of the internal combustion engine, the ECU 8 is also supplied with the battery voltage $V_B$ of the battery 4, an output signal of the current sensor 42 for detecting a load current Il which is supplied to electrical loads 41 such as a head light lamp, etc. connected to the vehicle-mounted battery 4, and an output signal of the current sensor 35 for detecting the field current $I_f$ supplied to the field winding 31 of the generator 3. These current sensors 42 and 35 are structured by utilizing a Hall effect element, for example.

Further, the ECU 8 is also supplied with an output signal A of a so-called air conditioner load switch 92 for detecting the operation of an electromagnetic clutch 91 which interrupts the coupling of the compressor 9 of the air conditioner to the crank shaft 11 of the internal combustion engine, so that whether the air conditioner has been turned on or not is detected.

In the above-described configuration, the power generation control unit 5 detects the output voltage $V_B$ of the battery 4 mounted on the vehicle, compares the detected output voltage with a predetermined reference value and controls the field current $I_f$, thereby to control the power generation operation of the generator 3. In the mean time, the ECU 8 takes in the operation parameters of the internal combustion engine outputted from the above-described various kinds of sensors and switches and performs predetermined operations. Based on the result of these operations, the ECU 8 then suitably controls various kinds of actuators (in the case of the above example, an injector for controlling the fuel to be supplied, ignition plugs for igniting the fuel supplied to the cylinders and a fuel pump for supplying the compressed fuel to the injector) so as to control the operation of the internal combustion engine in the same manner as the prior art technique.

According to the present invention, the ECU 8 is structured to control not only the operation of the internal combustion engine, but also the power generation operation of the generator 3. More specifically, a control pulse P is outputted from the output port of the I/O LS$_I$ 84 of the ECU 8 (the right end side of the I/O LS$_I$ 84 in FIG. 2) and the control pulse P is applied to an input terminal C of the control circuit 50 of the power generation control unit 5.

Figure 3:
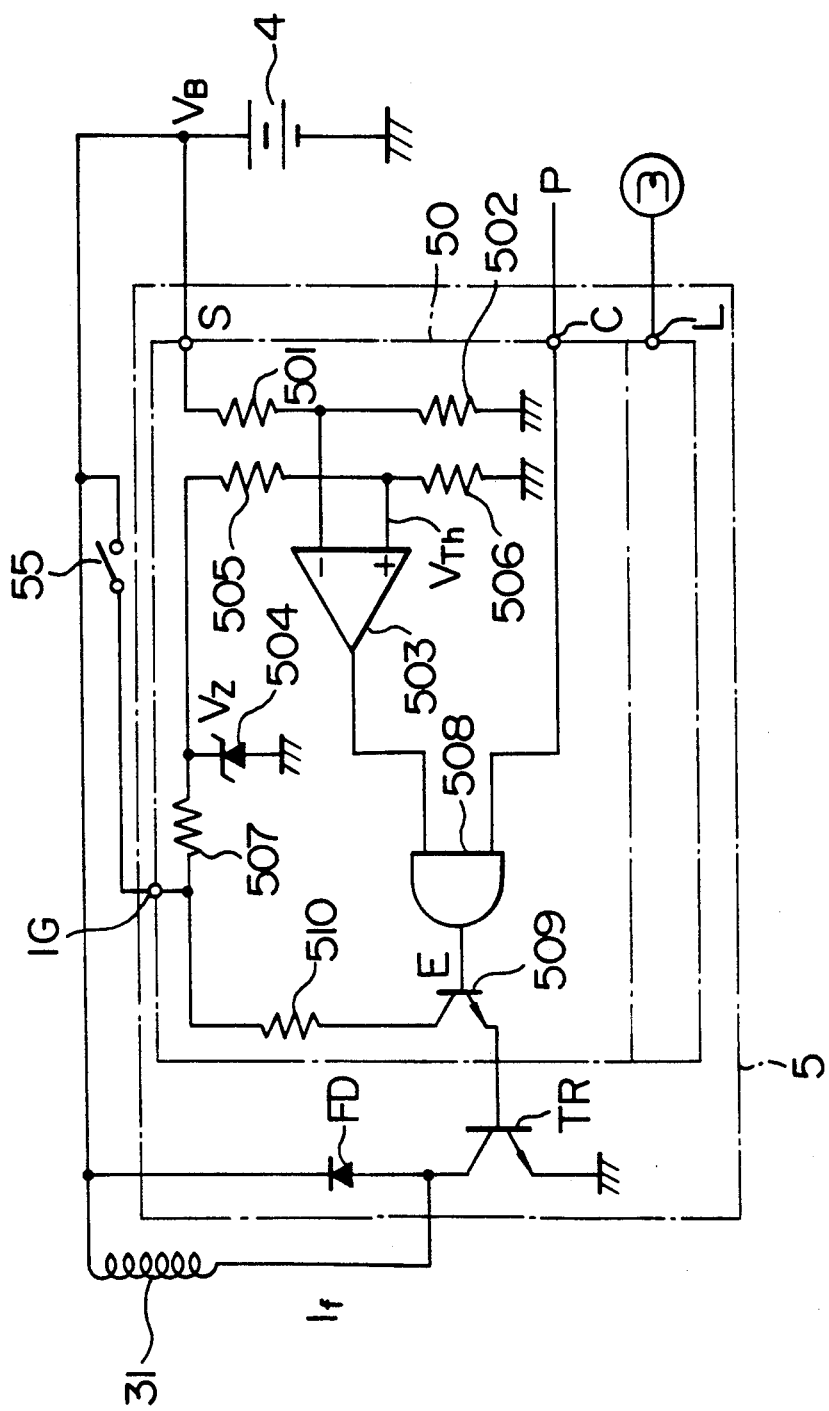
FIG. 3 is a circuit diagram showing the circuit configuration of the power generation control unit for the control system.

The circuit configuration of the control circuit 50 is shown in detail in the attached FIG. 3. In FIG. 3, the output voltage $V_B$ of the battery 4 is applied to the input terminal S of the control circuit 50, and series-connected voltage dividing resistors 501 and 502 are connected to the input terminal S. The voltage is divided by these resistors 501 and 502 connected in series, and a voltage appearing at the connection point is connected to a minus (−) input terminal of a comparator 503. In the mean time, a voltage is applied to a plus (+) input terminal of the comparator 503 from an IG input terminal by closing a key switch 55, for example, and a constant voltage Vz generated at both terminals of a Zener diode 504 is divided by voltage dividing resistors 505 and 506 and the divided voltage is applied as a reference value $V_{Th}$. A resistor 507 is a resistor inserted between the Zener diode 504 and the key switch 55.

An output of the comparator 503 is applied to one of the input terminals of an AND circuit 508, and an output of the AND circuit 508 is applied to a base terminal of a transistor 509. In the mean time, the control pulse P is applied to the other input terminal of the AND circuit 508 from the ECU 8 through the terminal C. A collector of the transistor 509 is connected to the battery 4 through a collector resistor 510 and the IG input terminal, and an output of the emitter is applied to the base of the power transistor TR of the power generation control unit 5.

Figure 4:
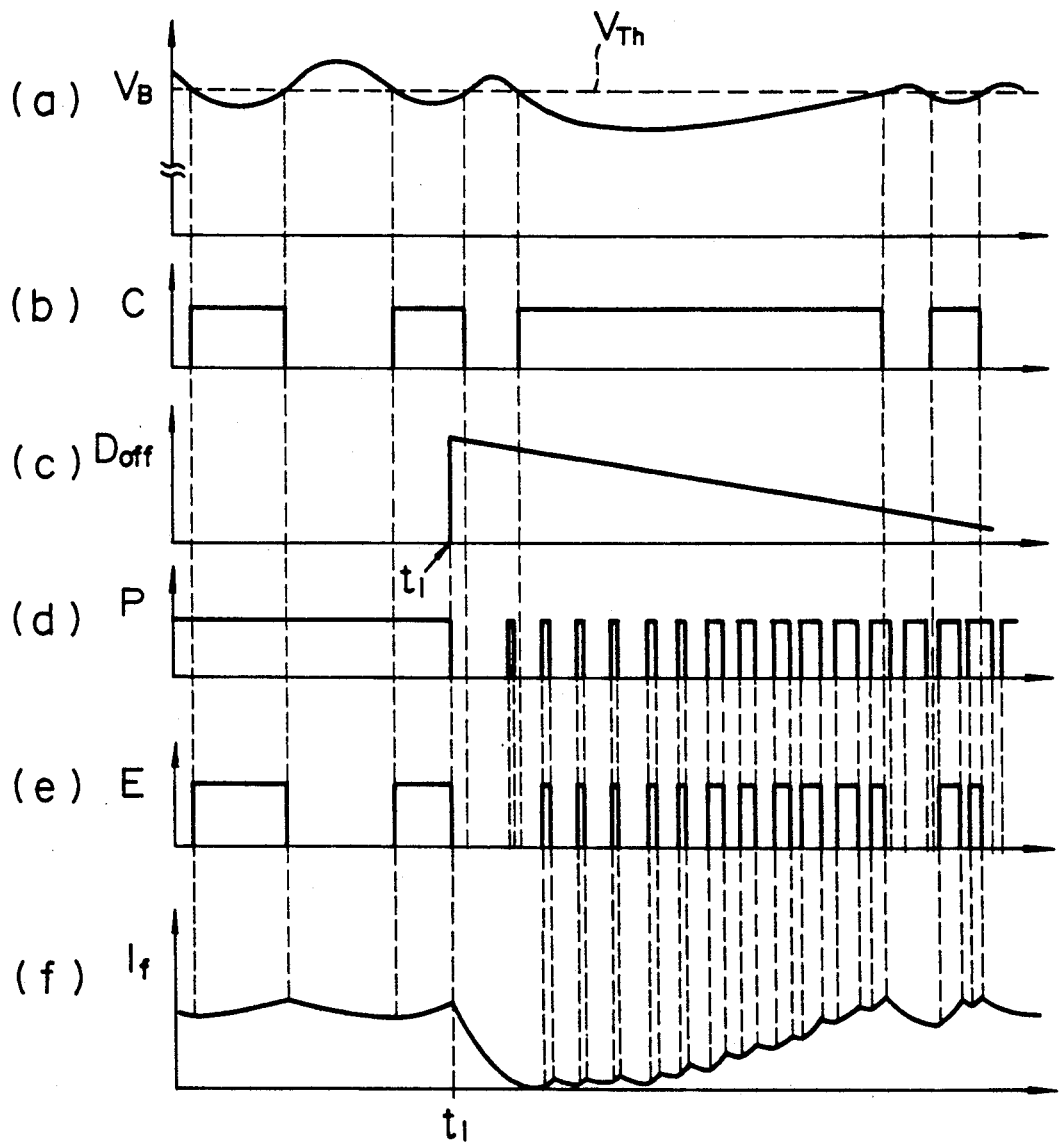
FIG. 4 is a waveform diagram for explaining the operation of the power generation control unit.

Operation of the above-described power generation control unit 5 will be briefly explained below with reference to the attached FIG. 4. First, as shown in FIG. 4(a), the comparator 503 compares the battery voltage $V_B$ with the predetermined reference voltage $V_{Th}$, and produces an ON output (for example, the same voltage as the power source voltage Vcc) when $V_B < V_{Th}$ and an OFF output (0 V) when $V_B \geq V_{Th}$, as shown in FIG. 4(b).

In the mean time, the control pulse P as shown in FIG. 4(d) is applied to the terminal C from the ECU 8, in accordance with a cut-off duty signal $D_{off}$ which changes in a predetermined pattern starting from a time $t_1$, as shown in FIG. 4(c), for example, details of which will be explained later.

Next, a logical product of the output C of the comparator 503 and the control pulse P is obtained by the AND circuit 506 and an output E is obtained as shown in FIG. 4(e) as a result. The output E is applied to the base of the power transistor TR for controlling the interruption of the field current $I_f$ of the generator 3, through a transistor 507, so that the power transistor TR is interruption controlled and the field current $I_f$ is controlled as shown in FIG. 4(f).

Figure 5:
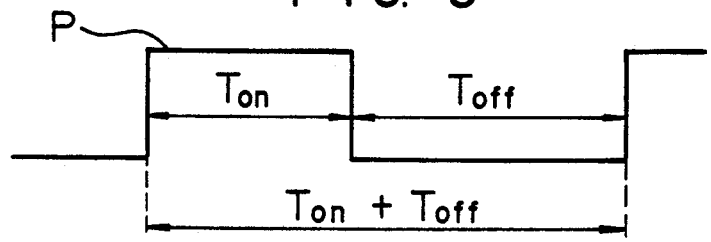
FIGS. 5 to 7 are signal waveform diagrams for explaining the meanings, shapes and operations of cut-off duty signals which characterize the present invention.

The cut-off duty signal $D_{off}$ which is generated by the ECU 8 as shown in FIG. 4(c) will be explained below with reference to the attached FIG. 5.

The cut-off duty signal $D_{off}$ expresses a time change (pattern) of an ON-OFF ratio (duty) of the control pulse P inputted to the power transistor TR through the AND circuit 508, and the value $D_{off}(\%)$ is given by the following expression:

$$D_{off} = T_{off}/(T_{on} + T_{off})$$

When the value of the cut-off duty signal $D_{off}$ is large, the off (break state) time of the power transistor TR becomes long with a reduction in the field current $I_f$. On the other hand, when the value of $D_{off}$ is small, the on (conductive state) time of the power transistor TR becomes long with an increase in the field current $I_f$.

Figure 6:
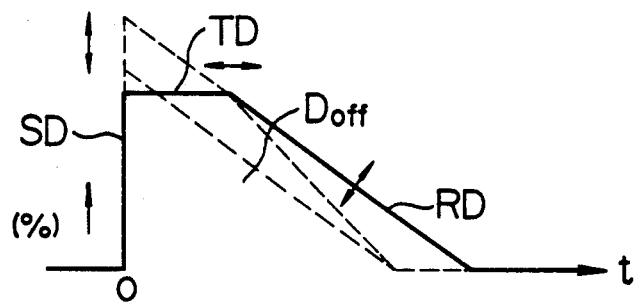

In the present invention, the power generation operation of the generator 3 mounted on the vehicle is controlled by inputting the cut-off duty signal $D_{off}$ into the input terminal C of the control circuit 50 in the power generation control unit 5. As shown in FIG. 6, the cut-off duty signal $D_{off}$ is formed in a triangular pattern or a rectangular pattern having a top portion of a triangle cut off in accordance with lapse of time. The pattern of the cut-off duty signal $D_{off}$ comprises an initial cut section SD which represents a cut quantity of an initial power generation, a delay section TD which maintains this value SD and an attenuation section RD which gradually reduces thereafter. A value of each of these sections can be set at various values as shown in broken lines in FIG. 6. For example, a maximum value of the SD is 100%, and the pattern of $D_{off}$ becomes a triangular shape when the value of the TD is zero (0).

Figure 7:
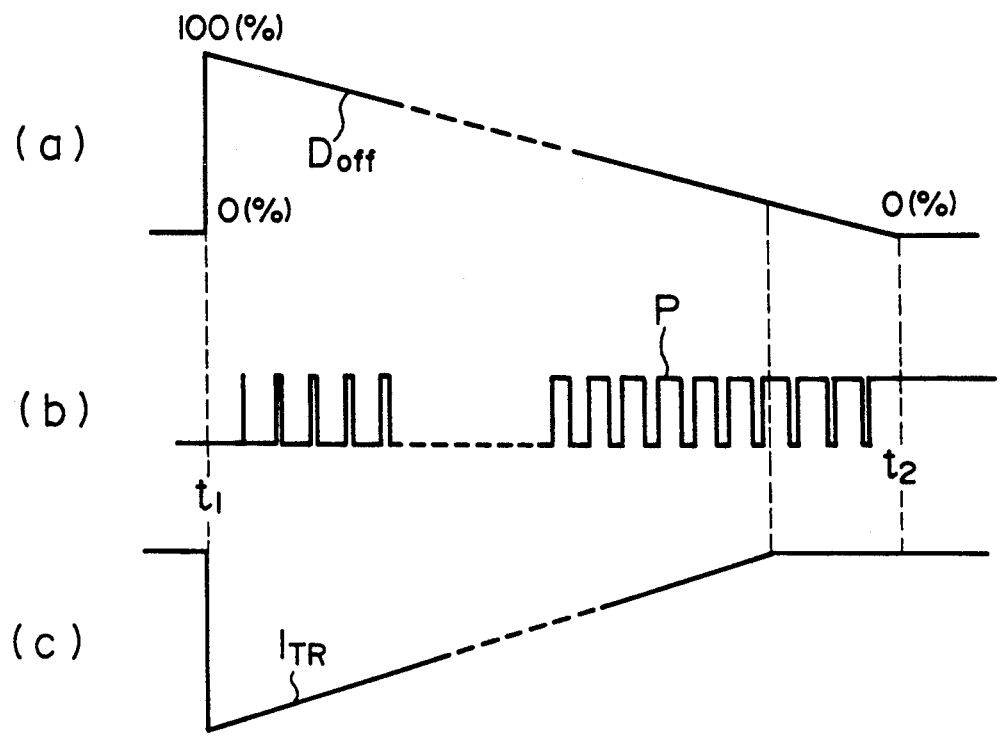

FIGS. 7(a), (b) and (c) show a triangular pattern for reducing the cut-off duty signal $D_{off}$ from 100% (at time $t_1$) to 0% (at time $t_2$) at a slow rate, a subsequent change of a waveform of the control pulse P and a subsequent change of a current $I_{TR}$ (a mean value) interrupted by the power transistor TR, respectively. As is clear from the above waveforms, as the $D_{off}$ gradually reduces from 100% to 0%, the off time of the above control pulse P reduces and, on the other hand, the on time increases. When the cut-off duty signal $D_{off}$ is applied to the input terminal of control circuit 50 of the power generation control unit 5 which controls the power transistor TR so that the field current $I_f$ becomes a predetermined value, the current $I_{TR}$ which flows through the power transistor TR reduces to 0 (A) as a mean value when the $D_{off}$ signal is inputted ($t_1$). Then, a mean value of the current $I_{TR}$ gradually recovers with lapse of time and returns to the original value at time $t_2'$ prior to the time $t_2$ when the $D_{off}$ becomes zero (0). In other words, the cut-off duty signal $D_{off}$ is superposed on the power transistor control signal which is formed by detecting the power source voltage $V_B$, and the cut-off duty signal $D_{off}$ is forcibly shifted to a cut-off state in accordance with a pattern only during a period when the power transistor TR is conductive, so that the field current $I_f$ is reduced.

The power generation control operation in the control system of the generator according to the present invention will be explained below with reference to the further explanatory diagram in FIG. 1. The operation to be described is performed by the CPU 81 and others within the ECU 8 shown in FIG. 2, and their detailed flow charts are shown later.

The CPU 81 in the ECU 8 controls the internal combustion engine 1 based on various inputted operation parameters, and at the same time, detects a change of the state of the load applied to the internal combustion engine and decides the kinds of the load applied (block 1001).

Figure 8:
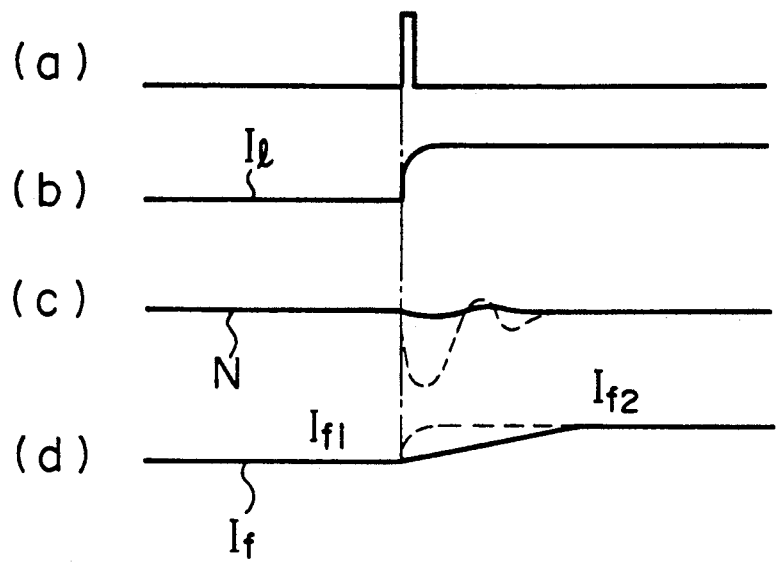
FIG. 8 is a waveform diagram showing the operation of the control system when an electrical load has suddenly increased.

When electrical loads of head lamps and other units are applied simultaneously at time $t_1$, the current Il to these electrical loads from the battery 4 increases suddenly, as shown in FIG. 8(b). Then, the current sensor 42 (FIG. 2) observes the state of the change of the load current Il, for example, $dIe/dt$, to detect an application of the electrical load, and an electrical load detection flag is set at the same time, as shown in FIG. 8(a).

In general, when a large current is applied to a load, the battery voltage $V_B$ of the battery 4 reduces, and accordingly, the power generation control unit 5 tries to increase the field current Il to increase the power generation of the generator 3 (as shown by a broken line in FIG. 8(d)). During a power generation operation, the generator 3 works as a load to the internal combustion engine 1, and a sudden turning on of an electrical load effectively becomes a sudden load on the internal combustion engine 1. Therefore, the number N of revolutions suddenly reduces and then returns to an original revolution speed (for example, an idle speed) after going through an up-and-down oscillation, as shown by a broken line in FIG. 8(c).

Such variations (oscillations) of the number N of revolutions following a sudden change (sudden increase) of an electrical load give a feeling of discomfort to the driver, resulting in loss of drivability. To avoid this problem, according to the present invention, the field current $I_f$ of the generator 3 which tries to suddenly increase the quantity of power generation is gradually changed during a predetermined period from the time ($t_1$) when the electrical load is suddenly changed (as shown by a solid line in FIG. 8(d)), to smoothen a variation of the load applied to the internal combustion engine so that the oscillation of the number N of revolutions is restricted (as shown by a solid line in FIG. 8(c)).

Referring to FIG. 1 again, in response to the kind of changes of the state of load decided in the manner as described above, the ECU 8 suitably sets a pattern of the cut-off duty signal $D_{off}$, which comprises a level Of the initial cut value SD, a length of the delay section TD and a slope of the attenuation section RD (as shown in blocks 1002, 1003 and 1004).

Figure 9:
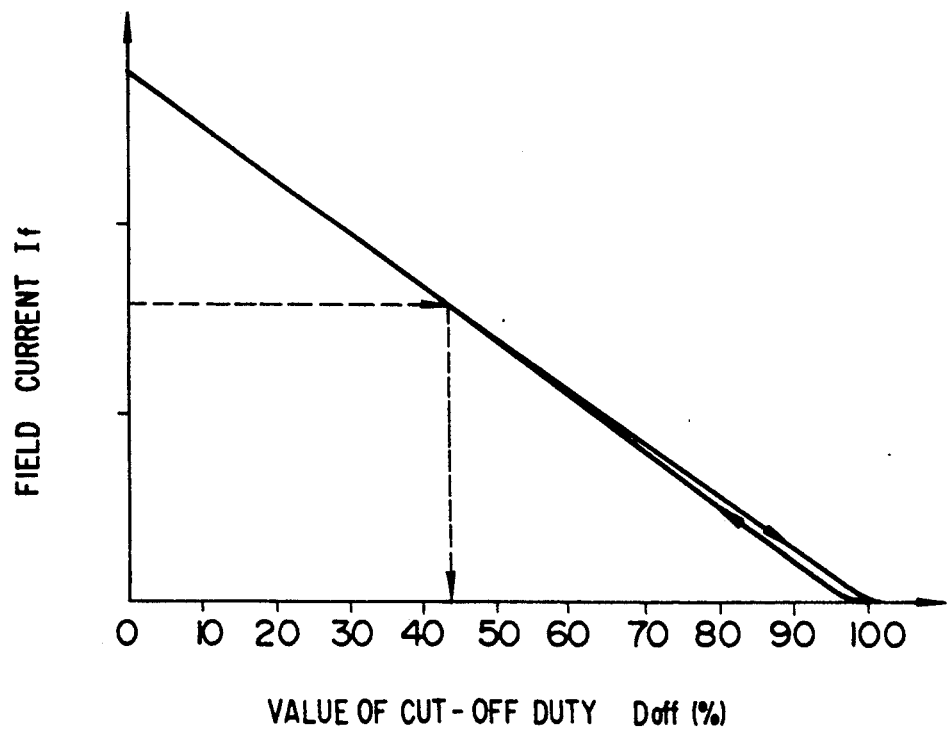
FIG. 9 is a graph showing the relationship between the field current which is used for controlling the electrical load when it has suddenly increased and the cut-off duty value.

More specifically, in the case of a sudden increase in the electrical load, for example, the length of the delay section TD is set to zero (0) and the level of the initial cut value SD is decided (block 1002). In other words, the field current $I_f$ immediately before turning on the electrical load at the time $t_1$ is obtained from the output from the current sensor 35 (FIG. 2), and a value of the cut-off duty signal $D_{off}$ corresponding to this value is obtained, which is set to be the initial cut value SD. In general, there exists a relationship as shown in FIG. 9 between the values of the field current $I_f$ and the cut-off duty signal $D_{off}$. This can also be realized in a simple manner by storing this in the ROM 83 which is part of the ECU 8, for example, and reading it out by using the value of the detected field current $I_f$ immediately before as a parameter.

Then, the ECU 8 sets a slope $dD/dt$ of the attenuation section RD (block 1004). In this case, an increase of the load is estimated from a slope ($dIl/dt$) of the load current Il which changes suddenly and the slope ($dD/dt$) of the attenuation section that corresponds to the load increase may be set, as an example, or the slope may be set at a predetermined value. Then, the ECU 8 outputs the control pulse P in accordance with the above set pattern of the cut-off duty signal $D_{off}$ by the I/O LSI 84 and controls the field current $I_f$ by the power generation control unit 5 to control the power generation operation of the generator 3 of the car. In other words, the field current $I_f$ is gradually increased to the value $I_{f2}$ corresponding to the load from the current value $I_{f1}$ regardless of the Sudden increase of the electrical load or the increase of the load of Il, as shown by the solid line in FIG. 8(d). Accordingly, the variation of the load to the internal combustion engine 1 of the generator 3 which becomes a mechanical load corresponding to the power generation quantity is smoothened, resulting in a smooth revolution output without involving up-and-down variations of the number N of revolutions (for example, the number of idle revolutions during an idle period), as shown in FIG. 8(c).

Referring to FIG. 1 again, the operation at the time of detecting an application of a load of a car air conditioner to the engine will be explained below. Unlike the above increase of the electrical load, when the car air conditioner is operated, the compressor 9 (FIG. 2) is connected to the output shaft 11 of the internal combustion engine by the work of the electromagnetic clutch 91. The turning on of the compressor by the electromagnetic clutch 91 is detected through the car air conditioner load clutch 91 (FIG. 2), and the flag indicating the car air conditioner load is set at the same time (FIG. 10(a)). When the compressor 9 is turned on, a sudden variation (increase) of the load on the internal combustion engine 1 results, and up-and-down oscillations of the number N of revolutions of the internal combustion engine occur as shown by a broken line in FIG. 10(b). After that, the number N of revolutions settles at a value corresponding to a predetermined load (for example, an idle speed rotation at the time of an idle operation) in the same manner as described above.

Figure 11:
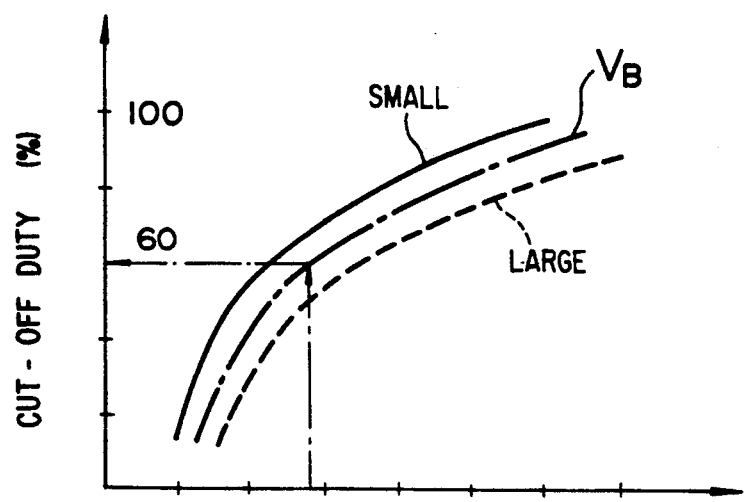
FIG. 11 is a graph showing the relationship between the number of revolutions of the internal combustion engine and the cut-off duty.

According to the present invention, variations of load are cancelled by controlling the power generation operation of the generator. In the block 1001 in FIG. 1, the load of the air conditioner is discriminated and the initial cut value SD of the pattern of the cut-off duty signal $D_{off}$ is set in the next block 1002. At this time, the length of the delay section TD is set to zero (0), the signal shape is triangular and the value of the SD is set to correspond to the number N of revolutions of the internal combustion engine and the output voltage $V_B$ of the battery 4, as shown in FIG. 11.

Figure 12:
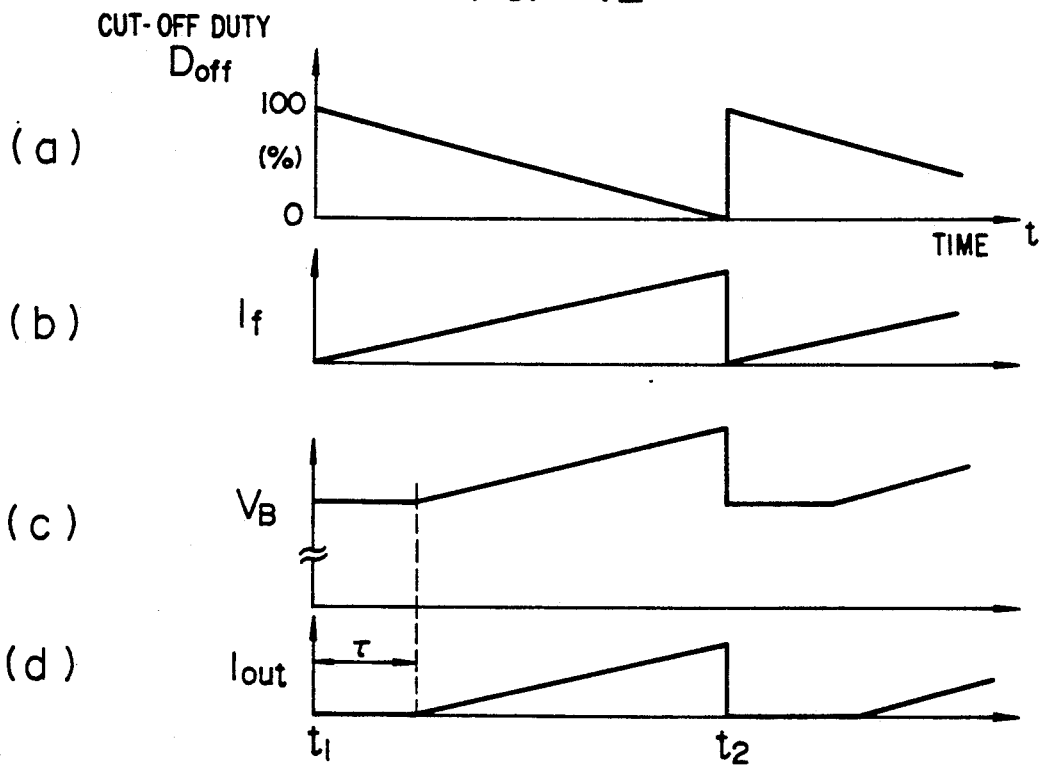
FIG. 12 is a signal waveform diagram for explaining the necessity of adjusting the initial cut section of the cut-off duty signal.

The above arrangement is made in order to minimize an idle time $\tau$ which is generated when the level of the initial cut value SD of the cut-off duty signal $D_{off}$ is started from the value of 100%, for example, at the time of a constant speed operation for an idle operation, as shown in FIG. 12(a). When the SD is set to 100%, the field current $I_f$ at first drops to 0 (A) and then gradually recovers to an original value, as shown in FIG. 12(b). However, the output voltage $V_B$ of the battery 4 charged by the generator 3 is kept at about 14 V, and accordingly power is not actually generated until the output voltage of the generator 3 reaches the battery voltage $V_B$, as is from FIGS. 12(c) and (d). Under this condition, the load on the internal combustion engine due to the generator 3 is zero (0) until the above idle time $\tau$ has passed from the starting point (t1) of the cut-off duty signal $D_{off}$, resulting in an unnecessary reduction of the load. Further, the period of this idle time $\tau$ will unnecessarily increase the number N of revolutions of the internal combustion engine, which may lead to a generation of the oscillation of the number N of revolutions. Accordingly, this idle time is not desirable. It is, therefore, necessary to minimize the idle time $\tau$. For this purpose, it is necessary to set the SD at a suitable value. Generally, the quantity of power generation by the generator 3 depends on the number of revolutions for driving the generator which is a speed for rotating the rotor (the number N of revolutions of the internal combustion engine), and the idle time $\tau$ also depends on the battery voltage $V_B$. Thus, as described above, the level of the initial cut value SD of the cut-off duty signal $D_{off}$ is set by the number N of revolutions of the internal combustion engine and the battery voltage $V_B$.

After the value of the SD has been set as described above, the slope dD/dt of the attenuation section RD is set in the block 1004. In this case, it is possible to set the slope dD/dt by using information relating to the cooling water temperature Tw of the internal combustion engine which is one of the parameters for expressing the operation state of the internal combustion engine, as an example. In the above embodiment, the slope is set fixedly at a predetermined value. This predetermined value should be suitably set by considering the load responsiveness of the internal combustion engine 1, etc. Then, in accordance with the set pattern of the $D_{off}$, the control pulse P is generated and the field current $I_f$ is controlled to control the power generation operation of the generator 3, in the same manner as described above.

Figure 10:
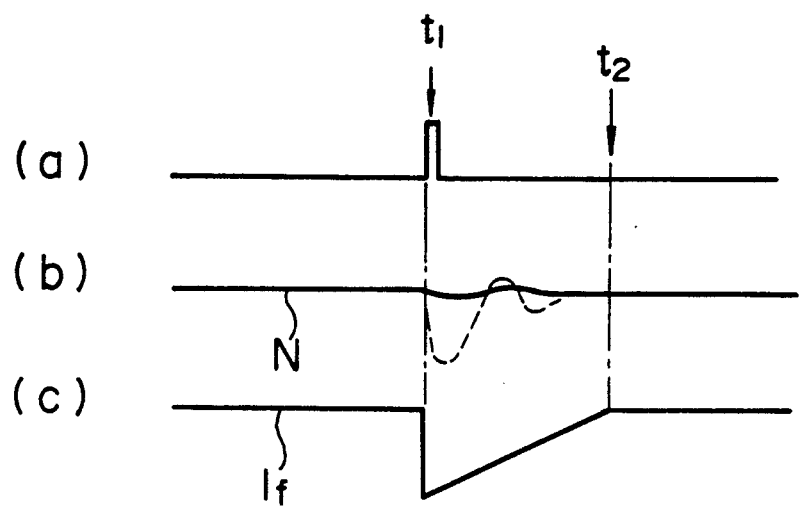
FIG. 10 is a waveform diagram for explaining the operation when a car air conditioner is actuated and becomes a load on the engine.

As shown in FIG. 10(c), the field current $I_f$ suddenly decreases at the time t1 when the load of the air conditioner is applied, in accordance with the triangular pattern of the $D_{off}$ signal, and then gradually returns to the original value. By the above-described change of the field current $I_f$, the sudden increase of the load to the internal combustion engine 1 following the turning on of the air conditioner load is cancelled by the reduction of the generator load following the reduction of the field current $I_f$. Then, the field current $I_f$ gradually returns to the original value, with a smooth increase of load to the internal combustion engine 1 and a constant maintenance of the number N of revolutions of the internal combustion engine because of the load responsiveness (particularly by the work of an idle speed control ISC mechanism for maintaining the engine revolution by regulating air flow by-passing a throttle valve during an idle operation) without generating up-and-down oscillations.

Figure 1:
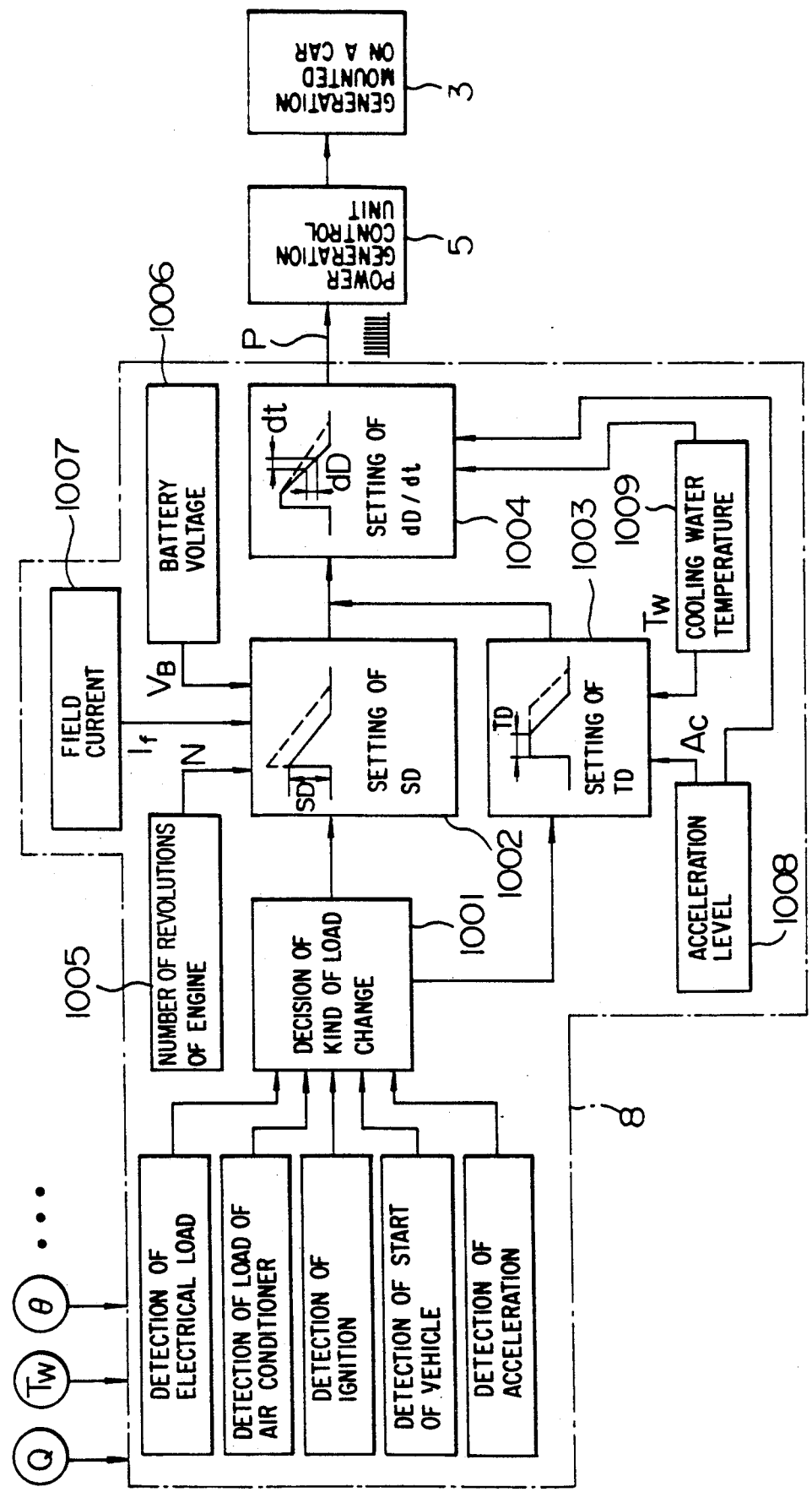
FIG. 1 is a functional explanatory diagram for explaining the operation of an engine control unit (ECU) which is an essential section of the control system for a generator according to the present invention.

Next, the operation when the ECU 8 has detected the time of starting the operation of the internal combustion engine will be explained (FIG. 1). The detection of the starting time is carried out by the output signal Ss of the starter switch 107 (FIG. 2).

Figure 14:
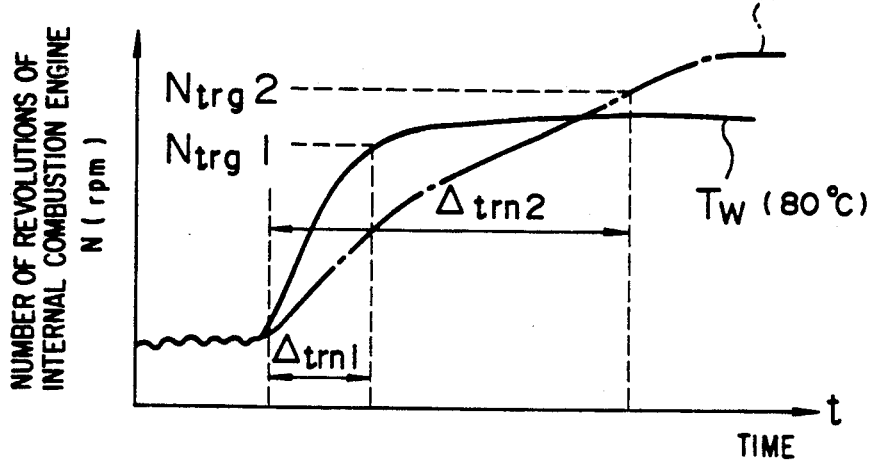
FIG. 14 is a graph showing the state of change of the number of revolutions of the internal combustion engine at the time of starting the engine operation.

In general, when the cooling water temperature Tw for expressing the temperature of the internal combustion engine is high (Tw $\approx$ 80° C.), the number N of revolutions of the internal combustion engine at its starting time reaches a target number Ntrg1 of revolutions in a relatively short period of time $\Delta t_{rn1}$ and then is stabilized, as shown in FIG. 14. On the other hand, when the cooling temperature Tw is low (Tw $\approx$ 0° C.), the number N of revolutions reaches a target number Ntrg2 of revolutions in a relatively long period $\Delta t_{rn2}$. Because of differences in viscosity of lubricating oil at low temperatures, etc., the target number Ntrg2 of revolutions at low temperature is set at a higher value than the target number Ntrg1 of revolutions at high temperatures. When the generator load is turned on during the periods of $\Delta t_{rn1}$ and $\Delta t_{rn2}$ when the operation of the internal combustion engine 1 is stabilized, the rise in the number N of revolutions is delayed so that an unstable state is easily generated, resulting in a halt of the operation of the internal combustion engine depending on the situation.

To solve the above problem, the power generation operation of the generator 3 mounted on the vehicle is forcibly stopped during a period while the starter for driving the operation of the internal combustion engine 1 is being turned on at the starting time and the power generation operation of the internal combustion engine is gradually returned to the normal state in correspondence with the operation state of the internal combustion engine after the operation of the starter has stopped, so that the startability of the internal combustion engine is improved.

Figure 13:
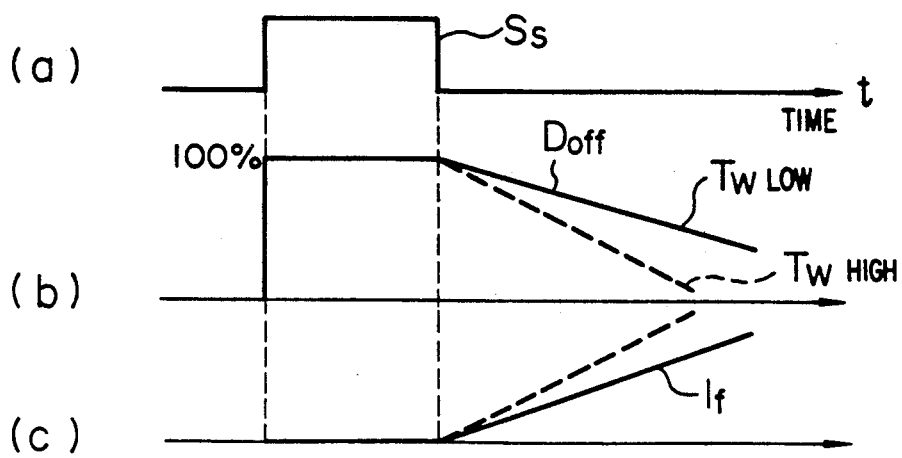
FIG. 13 is a waveform diagram showing the operation of the control section at the time of starting the engine operation.

In other words, as shown in FIG. 13(a), the ECU 8 detects the starting time of the internal combustion engine 1 by applying an output signal Ss from the starter switch 107 (block 1001 in FIG. 1). At the same time, the level of the initial cut value SD of the cut-off duty signal $D_{off}$ is automatically set to 100%, and this state is continued until the output signal Ss is turned on and the turning on of the starter has been completed as shown in FIG. 13(b) (block 1003). At the same time when this output signal Ss is turned off, the slope dD/dt of the attenuation section RD of the cut-off duty signal $D_{off}$ is set (block 1004). At this time, the ECU 8 sets this slope based on the output Tw from the water temperature sensor 102 (FIG. 2).

Figure 15A:
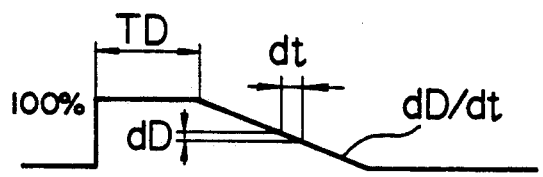
FIGS. 15A, 15B and 15C are diagrams showing other control systems for the above starting time.
Figure 15B:
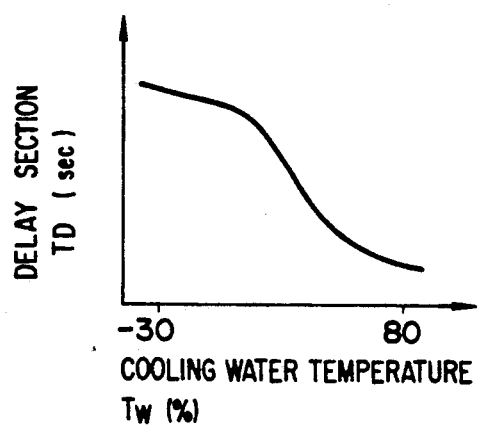
Figure 15C:
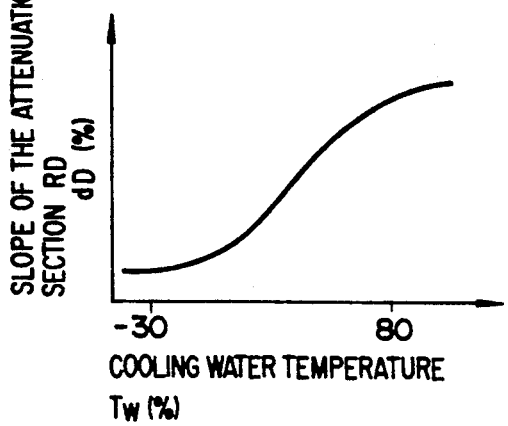

In addition to the above method, it is also possible to set the duration of the delay section TD of the cut-off duty Signal $D_{off}$ in accordance with the cooling water temperature of the internal combustion engine as well as the slope dD/dt of the attenuation section RD of the cut-off duty signal $D_{off}$, as shown in FIGS. 15A to 15C, for example. In this case, the initial cut value SD is of course set to 100%. The slope dD of the attenuation section RD shown in FIG. 15C shows only the change portion dD of a clock distance dt of the microcomputer.

Further, at the time when the vehicle starts to move, the load to the internal combustion engine 1 suddenly increases in the same manner as described above. In this case, the power generation operation of the generator 3 mounted on the vehicle is temporarily stopped to forcibly remove the generator load so that the output torque of the internal combustion engine 1 is used for moving the vehicle.

Figure 16:
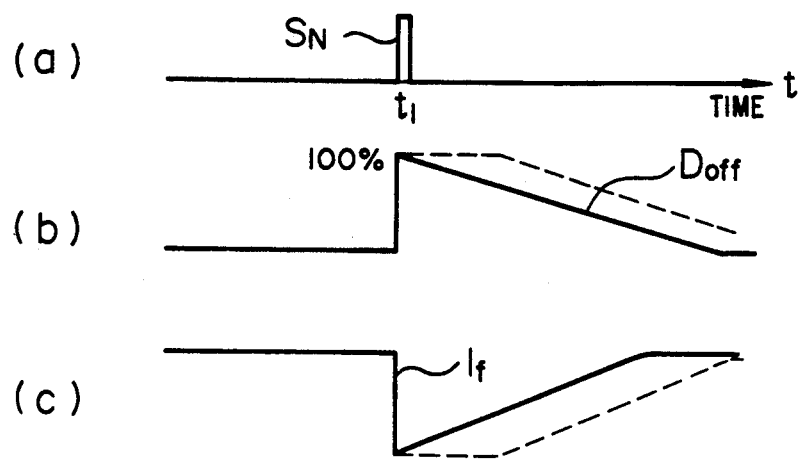
FIG. 16 is a waveform diagram for showing the operation of the control system at the time of starting the vehicle to move.

As shown in FIGS. 16(a) to 16(c), the ECU 8 first decides the time of starting to move the vehicle by an output $S_N$ of a neutral switch 108 provided in the transmission 2 (FIG. 2) (block 1001 in FIG. 1) and by detecting that the transmission is in a neutral state, and sets the initial cut value SD of the cut-off duty signal $D_{off}$ to 100% (block 1002). Then, the ECU 8 sets the duration of the delay section TD of the $D_{off}$ signal and the slope dD/dt of the attenuation section RD (blocks 1003 and 1004). In this case, it is possible to set those values corresponding to the cooling water temperature Tw of the internal combustion engine, for example, but it is also possible to set predetermined constant values in the above embodiment. In FIGS. 16(a) to 16(c), solid lines show the case where the duration of the delay section TD is zero (0) and broken lines show the case where the duration of the delay section TD is set at a predetermined value.

Figure 17A:
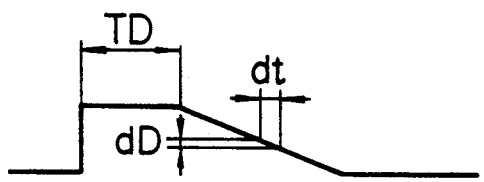
FIGS. 17A, 17B and 17C are diagrams for explaining the operation of the control system at the time of an acceleration.
Figure 17B:
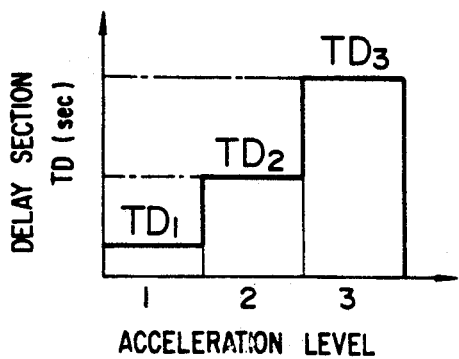
Figure 17C:
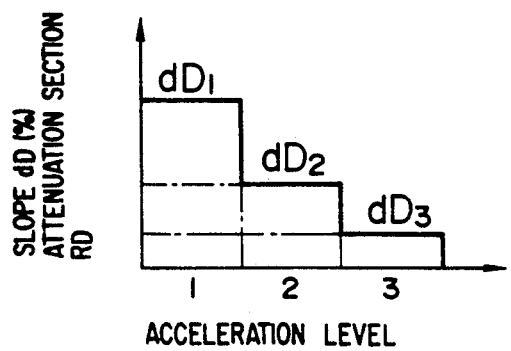

Last, a change rate $\Delta\theta$ is obtained from an output signal $\theta$ of the throttle sensor 103 (FIG. 2) to detect the acceleration state (block 1001). Then, the initial cut value SD of the cut-off duty signal $D_{off}$ is set to 100% (block 1002). Then, the length of the delay section TD of the $D_{off}$ and the slope of the attenuation section RD are set respectively in accordance with the degrees of acceleration (blocks 1003 and 1004). In the present embodiment shown in FIGS. 17B and 17C, for example, acceleration is divided into three staged levels, including an acceleration level 1, an acceleration level 2 and an acceleration level 3. Patterns are decided by utilizing a preset delay section TD and slopes dD/dt of the attenuation corresponding to each level. As a result, at the time of acceleration, the power generation operation of the generator 3 is interrupted, to reduce the load on the internal combustion engine and improve acceleration as well as to suitably set the change of the generator load to the internal combustion engine in accordance with the state of acceleration.

Next, the power generation control operation, the outline of which has been explained above, will be explained below with reference to flow chart operations which are executed by the ECU 8.

Figure 18:
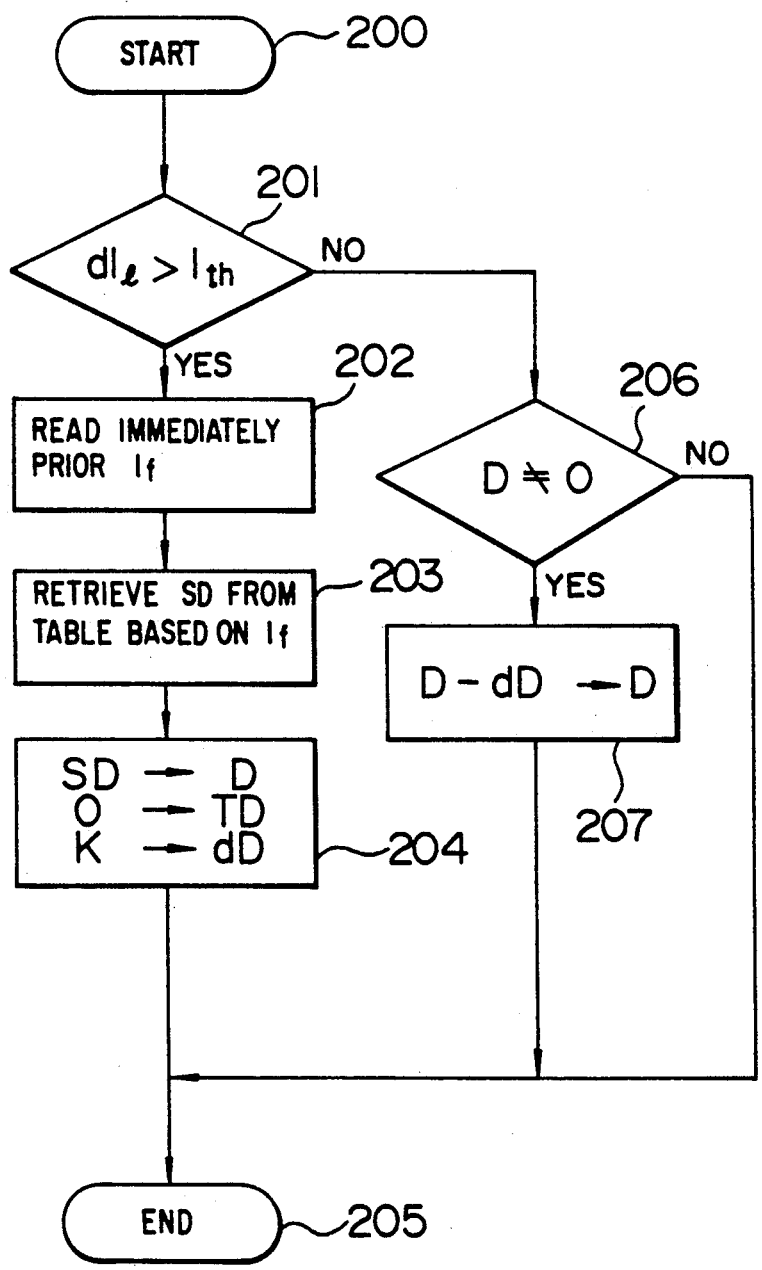
FIGS. 18 to 22 are flow charts showing various kinds of operation of the control system.

FIG. 18 is a flow chart for the detection of an electrical load (FIG. 1). When the processing is started by the clock of 10 ms, for example, (step 200), the ECU 8 obtains a change rate dIl of the load current Il and compares it with a reference value Ith (step 201). When dIl>Ith is detected as a result of the comparison ("YES"), the field current $I_f$ of the generator 3 which is a value of $I_f$ immediately before detecting a sudden change of the electrical load is read (step 202). By the above-obtained value of $I_f$, the initial cut value SD Of the cut-off duty signal $D_{off}$ is retrieved from a table which stores the relationship as shown in FIG. 9, for example, (step 203). Then, the above-obtained value of SD is set to D and TD is set to zero (0), and further a constant value K is applied to dD, to set a pattern of the $D_{off}$ signal (step 204). Thus, the process is terminated (step 205).

Then, in the step 201, "NO" results and a decision is made whether the D is zero (0) or not (step 206). When D is not zero (0), (that is "YES"), dD is subtracted from the value of D (step 207), and the process is terminated (step 205). When the above value of D is found to be zero in the step 201 after repeating the above subtraction (that is "YES"), the process is immediately terminated (step 205).

Figure 19:
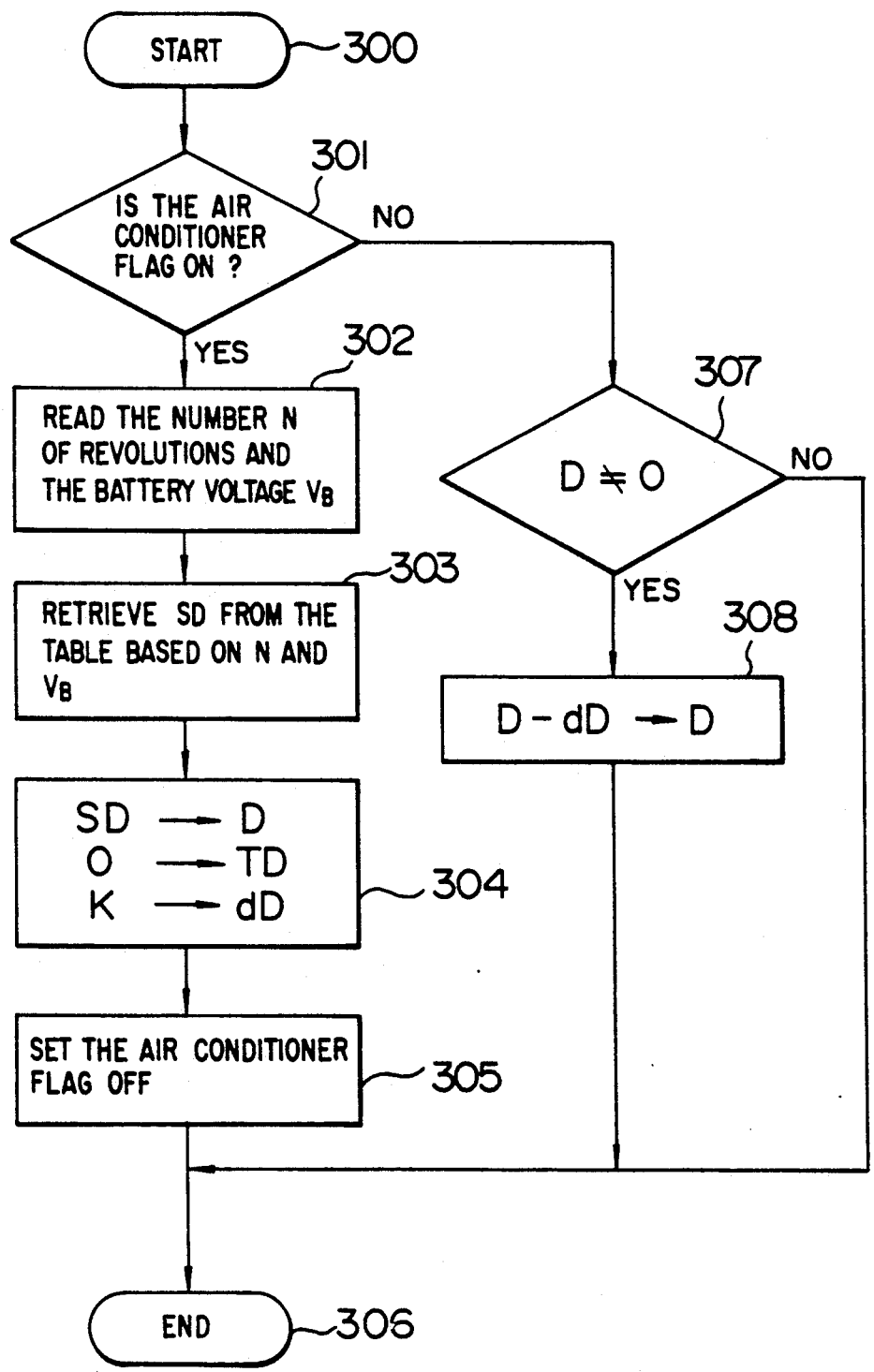

FIG. 19 shows a flow chart for the detection of the air conditioner load. When the processing is started (step 300), a decision is made whether the air conditioner flag is on or not (step 301). When the decision of YES is given as a result, the number N of revolutions and the battery voltage $V_B$ are read (step 302), and the table is retrieved by using N and $V_B$ to obtain SD (step 303). Then, the above value of SD is set to D, zero (0) is set to TD and a constant value K is applied to dD to set a pattern of the cut-off duty signal $D_{off}$ (step 304). Then the above air conditioner load flag is turned off (step 305) and the process is terminated (step 306).

The process is repeated by gradually reducing D until it is zero (steps 307 and 308) in the same manner as shown in FIG. 18. According to the operations shown in these flow charts, a right-angled triangular pattern for gradually reducing the value of D with lapse of time (FIG. 6) is generated.

Figure 20:
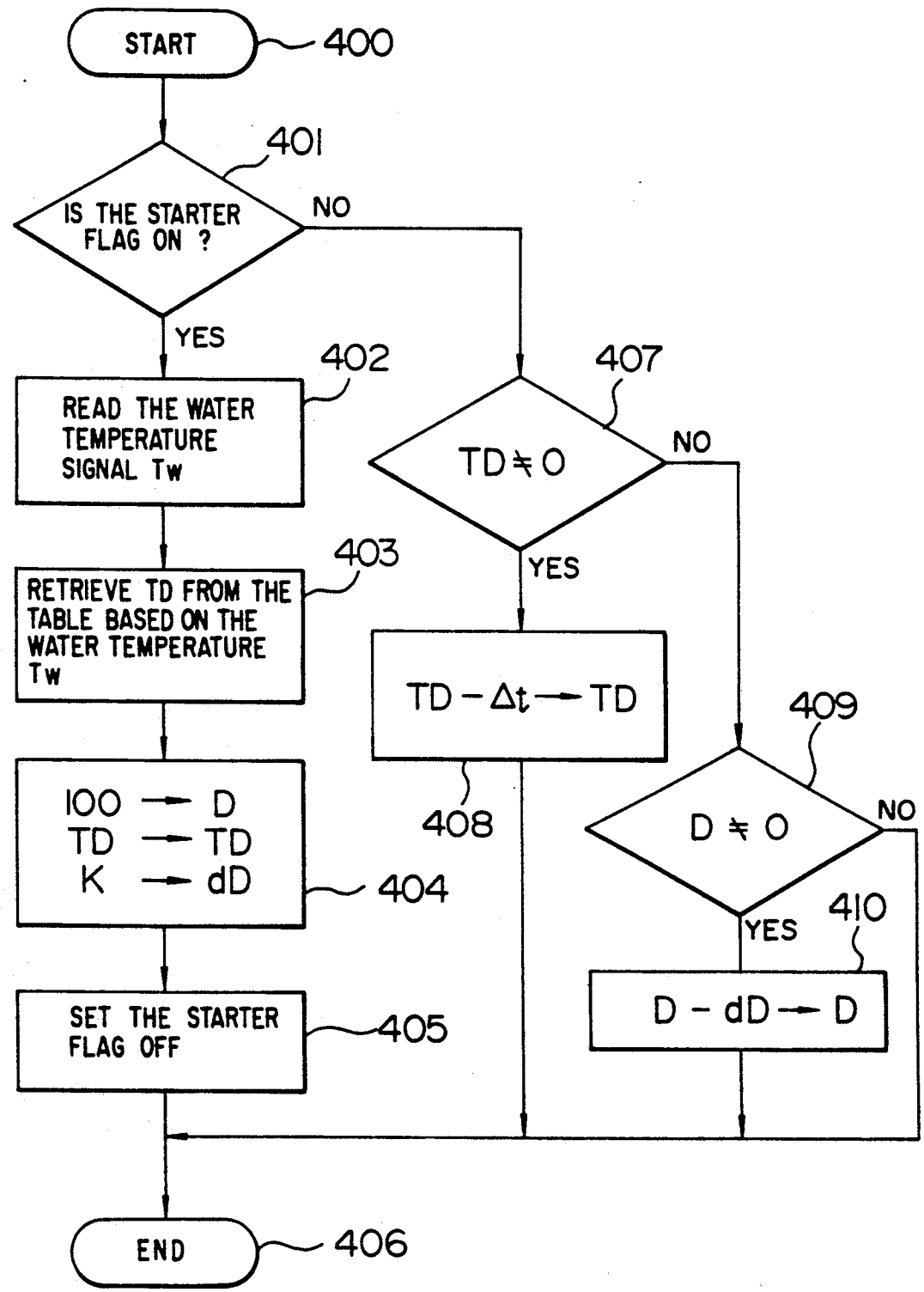

FIG. 20 shows a flow chart for the detection of a starting time of the internal combustion engine. When the processing is started (step 400), a decision is made whether the starter flag is on or not (step 401). When the decision is "YES", the water temperature signal Tw is read (step 402) and TD is searched by using the water temperature signal Tw as a parameter (step 403). Then, D is set at 100, the above-retrieved value of TD is set to a new TD and a constant value K is applied to dD (step 404), and the starter flag is set at off (step 405). Thus, the process is terminated (step 406), resulting in a setting of a square pattern.

When a decision of "NO" is given in the step 401, the flow shifts to the right side of FIG. 20 to decide whether TD is zero or not (step 407). When a decision is made that TD is not zero (0), (that is "YES"), a value of $\Delta t$ corresponding to the clock interval is subtracted from TD and the process is terminated (406). The above operation is repeated until TD becomes zero. When TD become zero, the flow shifts to the right side of FIG. 20 and the process is repeated by gradually reducing D until it reaches zero (steps 409 and 410). Thus, the process is terminated (step 406).

Figure 21:
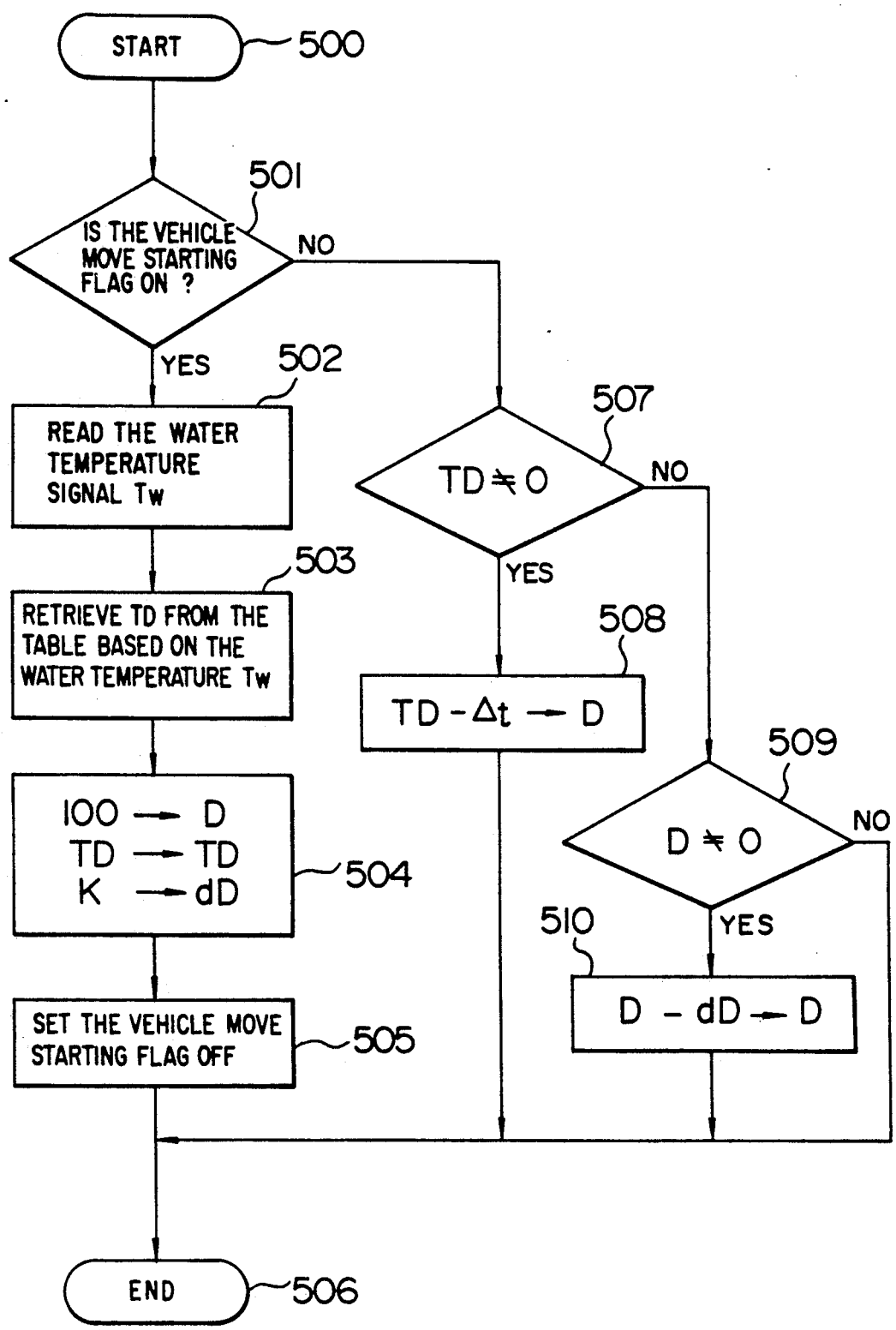

FIG. 21 shows a flow chart for starting movement of the vehicle. In step 501, it is confirmed whether the vehicle starting flag is on or not. The rest of the steps of the flow chart are the same as that of FIG. 20 except step 505 in which the vehicle starting flag is set at off, and so a detailed explanation of these steps is omitted. According to this flow chart, the value of D gradually reduces after a lapse of a predetermined time period (TD). A so-called trapezoidal pattern (FIG. 6) is formed as a result.

Figure 22:
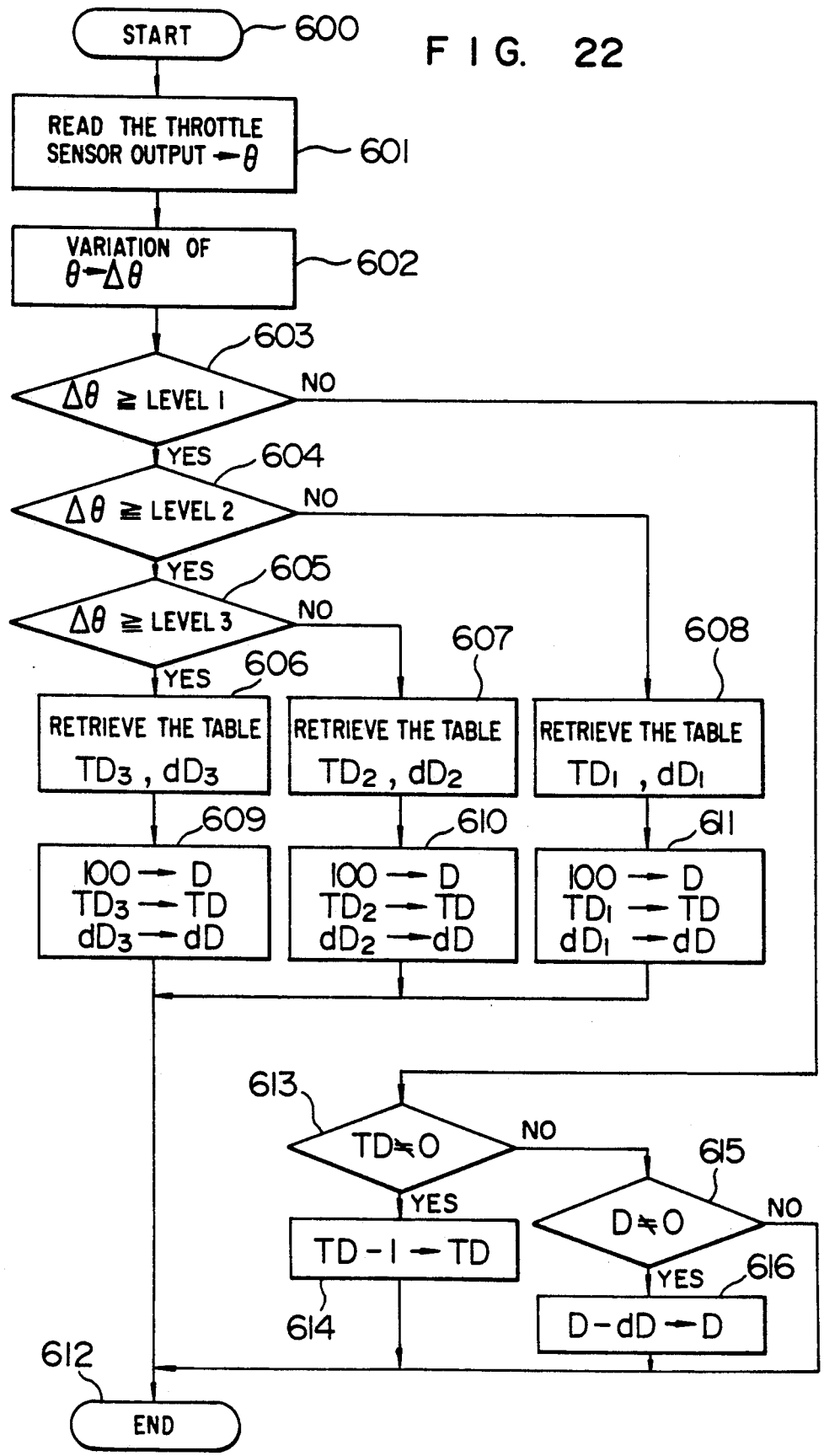

FIG. 22 shows a processing flow for accelerating the vehicle running speed. When the processing is started (step 600), an output 0 of the throttle sensor 103 (FIG. 2) is read (step 601). The value of $\theta$ which was read previously is substracted from the value of $\theta$ which was read this time, then a change quantity $\Delta\theta$ is obtained, and a decision is made about the level where $\Delta\theta$ is positioned (steps 603, 604 and 605). The process goes to step 606 when the degree of acceleration is equal to or larger than the level 3, the process goes to step 607 when the degree of acceleration is smaller than the level 3 and larger than level 2, and the process goes to step 608 when the degree of acceleration is between level 2 and level 1, to retrieve a table to obtain corresponding values of $TD_3$, $dD_3$, $TD_2$, $dD_2$, $TD_1$ and $dD_1$, respectively (refer to FIGS. 17B and 17C for the relation between the acceleration level, TD and dD). Then, values of $TD_3$, $dD_3$, $TD_2$, $dD_2$, $TD_1$ and $dD_1$ obtained by the above retrieval are applied to TD and dD respectively (steps 609, 610 and 611) and 100 is applied to D to set a pattern, thus terminating the process (step 612). Then, D is changed in accordance with the set pattern in the same manner as the above-described flow charts (steps 613 to 616).

As is clear from the above explanation, according to the control system for a generator for a vehicle, it is possible to absorb a sudden change of the state of the load on the internal combustion engine, even if it is generated, by controlling the state of power generation of the generator so that the operation of the internal combustion engine is made smooth and an occurrence of oscillation is restricted to exhibit an excellent effect of providing the vehicle driver with an optimum driving condition without any discomfort.

We claim:

1. A control system for controlling the field current of a generator, driven by an internal combustion engine, so as to vary the output power of said generator, comprising:

storage means charged by said power generated by said generator; field current control means for controlling the field current of said generator in response to an output voltage of said storage means; and engine control means responsive to operation parameters of said internal combustion engine for controlling at least one of a fuel supply and an ignition timing for said internal combustion engine, including means for determining a kind of change of a load applied to said internal combustion engine when said load has changed and for controlling the field current of said generator in accordance with a predetermined control pattern corresponding to said kind of change of the load.

2. A control system for controlling the field current of a generator, driven by an internal combustion engine, so as to vary the output power of said generator, comprising:

storage means charged by said power generated by said generator; field current control means for controlling the field current of said generator in response to an output voltage of said storage means; and engine control means responsive to operation parameters of said internal combustion engine for controlling at least one of a fuel supply and an ignition timing for said internal combustion engine, including means for determining a kind of change of a load applied to said internal combustion engine when said load has changed and for controlling the field current of said generator in accordance with a predetermined control pattern corresponding to said kind of change of the load; wherein said predetermined control pattern comprises an initial cut section for defining an initial power generation cut value, a delay section for maintaining said power generation at said initial power generation cut value and a reduction section for gradually returning said power generation from said initial power generation cut value to an original power generation value.

3. A control system for a generator according to claim 2, wherein said engine control means sets the duration of said delay section of said predetermined control pattern corresponding to a temperature of said internal combustion engine when it is decided that said internal combustion engine is in an igniting state.

4. A control system for a generator according to claim 2, wherein when it is decided that said internal combustion engine is in an acceleration sate, said engine control means detects the level of the acceleration and sets the duration of said delay section of said predetermined control pattern according to said acceleration level.

5. A control system for a generator according to claim 2, wherein when it is decided that the vehicle having said internal combustion engine is in a state of starting, said engine control means sets the duration of said delay section of said predetermined control pattern according to a temperature of said internal combustion engine.

6. A control system for a generator according to claim 2, wherein when it is decided that said internal combustion engine is in an idle state, said engine control means sets the duration of said delay section of said predetermined control pattern to zero.

7. A control system for a generator according to claim 3, wherein said engine control means further sets said initial power generation cut value of said predetermined control pattern to 100% in terms of a duty ratio defined by the off time ratio of a power transistor for controlling the generator.

8. A control system for a generator according to claim 4, wherein said engine control means further sets said initial power generation cut value of said predetermined control pattern according to a number of revolutions of said internal combustion engine.

9. A control system for a generator according to claim 5, wherein said engine control means further sets said initial power generation cut value of said predetermined control pattern according to a number of revolutions of said internal combustion engine.

10. A control system for a generator according to claim 6, wherein when an electrical load of said generator has increased, said engine control means further sets said initial power generation cut value of said predetermined control pattern according to an output current from said generator before said increase of the electrical load and the output voltage of said storage means.

11. A control system for a generator according to claim 6, wherein when a mechanical load to said internal combustion engine has increased, said engine control means further sets said initial power generation cut value of said predetermined control pattern according to a number of revolutions of said internal combustion engine and the output voltage of said storage means.

12. A control system for a generator according to claim 4, wherein said engine control means further sets the slope of said reduction section of said predetermined control pattern according to said level of acceleration.

13. A control system for a generator according to claim 5, wherein said engine control means further sets the slope of said reduction section of said predetermined control pattern according to said temperature of said internal combustion engine.

14. A control system for a generator according to claim 1, wherein said predetermined control pattern comprises an initial cut section for defining an initial power generation cut value and a reduction section for gradually returning said power generation from said initial power generation cut value to an original power generation value.

* * * * *